Figure 1:
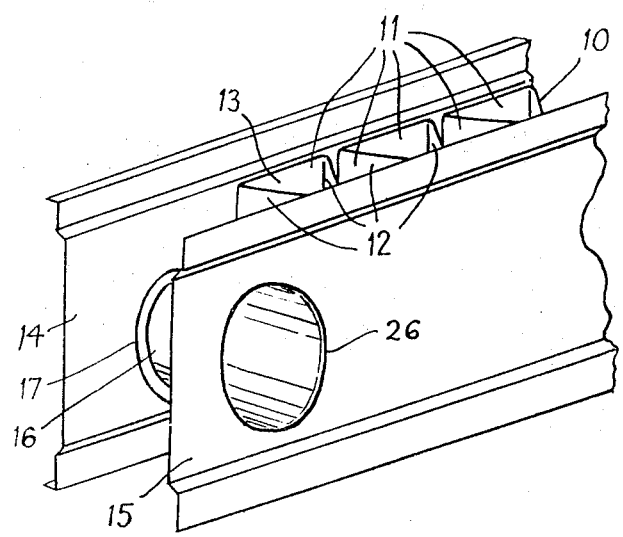

United States Patent [19]
Bemrose et al.

[11] 3,840,423
[45] Oct. 8, 1974

[54] APPARATUS FOR BONDING HEAT-EXCHANGER COMPONENTS

[75] Inventors: Colin R. Bemrose; Christopher J. Davenport, both of Leamington Spa, England

[73] Assignee: Associated Engineering Limited, Leamington Spa, England

[22] Filed: Sept. 13, 1971

[21] Appl. No.: 179,960

[30] Foreign Application Priority Data

Sept. 25, 1970 Great Britain.................... 45899/70

[52] U.S. Cl..................... 156/583, 29/18, 29/472.1, 52/584, 100/295, 156/292, 156/309, 156/391, 156/499, 161/68, 161/133, 165/152
[51] Int. Cl. ..... B30b 15/34, B32b 31/00, F28d 9/02
[58] Field of Search .......... 156/210, 282, 292, 309, 156/499, 580, 583, 391, 553, 581; 161/133, 68; 29/18, 472.1; 52/584; 292/256; 100/295; 264/299; 165/152

[56] References Cited
UNITED STATES PATENTS

| 2,101,836 | 12/1937 | Benedict | 156/292 X |
| 2,371,847 | 3/1945 | Saunders et al. | 156/292 X |
| 2,796,157 | 6/1957 | Ginsburg | 161/68 X |
| 3,037,592 | 6/1962 | Shipley et al. | 52/618 |
| 3,086,899 | 4/1963 | Smith et al. | 156/292 X |
| 3,089,520 | 5/1963 | Huet | 161/133 X |
| 3,102,182 | 8/1963 | Oelze et al. | 219/19 |
| 3,359,616 | 12/1967 | Butt | 29/472.1 X |
| 3,368,933 | 2/1968 | Wicker | 156/580 X |

Primary Examiner—Charles E. Van Horn
Assistant Examiner—Robert A. Dawson
Attorney, Agent, or Firm—Briseboise & Kruger

[57] ABSTRACT

A heat exchanger assembly is made by positioning a corrugated metal strip, together with two tubular spacer members, between sheet members having holes which are aligned with the spacer members and bonding the assembly together by heating to cure an adhesive between the corrugated strip and the sheet members.

3 Claims, 5 Drawing Figures

PATENTED OCT 8 1974          3,840,423

SHEET 1 OF 3

APPARATUS FOR BONDING HEAT-EXCHANGER COMPONENTS

This invention relates to a method of and an apparatus for the manufacture of a heat exchanger having a part made of metal foil, and is applicable particularly, but not exclusively to the heat exchanger of the type described in our copending Application No. 755,077, now U.S. Pat. No. 3,521,077.

According to one aspect of the present invention, there is provided a method of manufacturing a heat exchanger having a corrugated strip of metal foil bonded between two sheet-like metal members, which includes the steps of supporting the corrugated strip and the sheet-like metal members in such a way that the corrugated strip of metal foil is positioned between the two sheet-like metal members, providing a heat-settable adhesive in positions to bond the corrugated strip to the metal members, pressing each of the sheet-like members against a respective face of the corrugated strip and heating the heat-settable adhesive to bond the sheet-like members to the corrugated strip.

Preferably the method includes previously precoating with adhesive the faces of the sheet-like metal members which are to adhere to the corrugated strip.

In one embodiment of the invention the method may include heating the sheet-like members and adhesive until the latter is cured, and then applying a stream of coolant fluid to the corrugated strip until the adhesive is at least partly set.

According to another aspect of the invention there is provided apparatus for manufacturing a heat exchanger having a corrugated strip of metal foil bonded between two sheet-like members by means of a heat-settable adhesive including an arrangement for supporting the corrugated strip between the sheet like members in the unbonded state, a mechanism for pressing the sheet-like members against the corrugated strip and heaters arranged to heat the sheet-like members and cure adhesive between the members and the strip.

Figure 5:
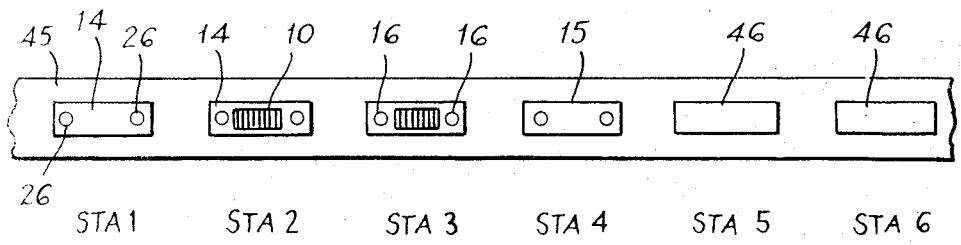
Figure 2:
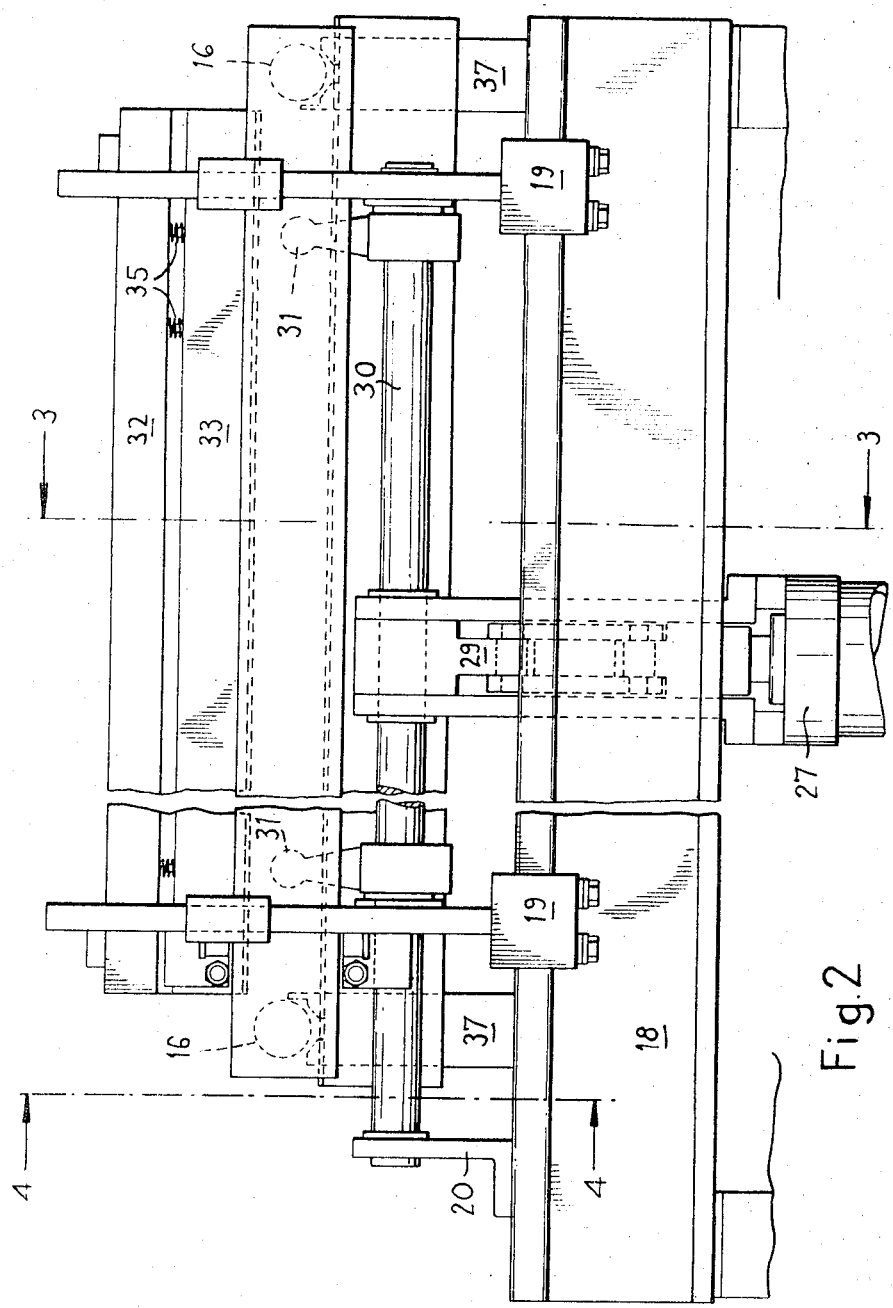
Figure 3:
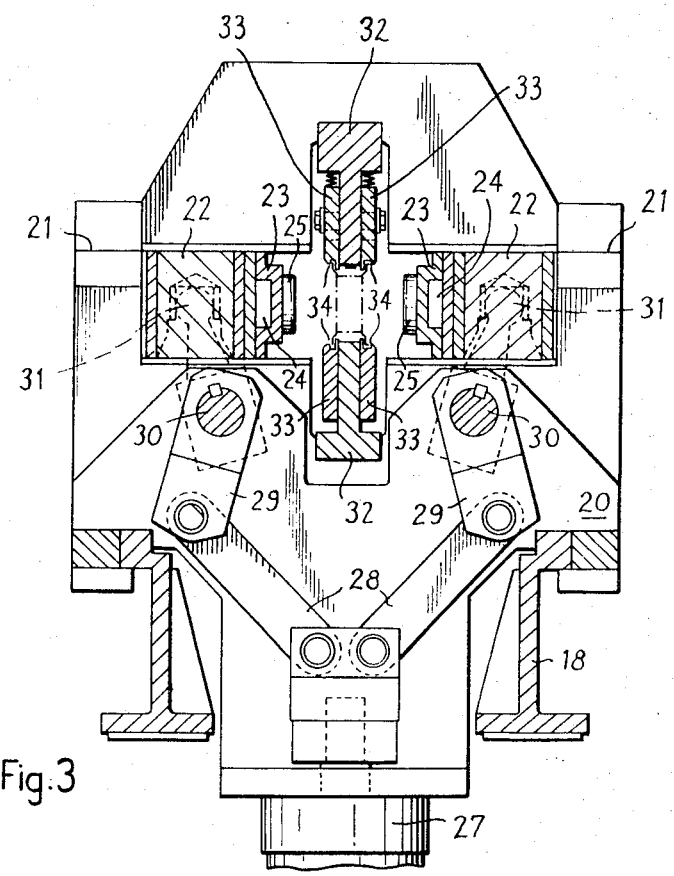
Figure 4:
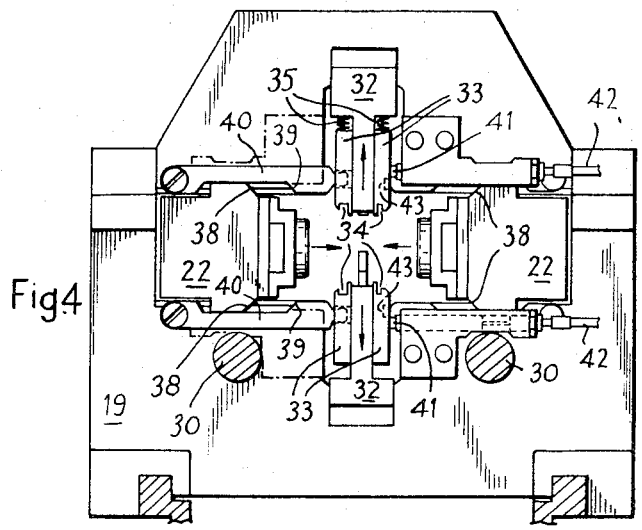

The invention is described, by way of example only, with reference to the accompanying drawings in which:

FIG. 1 is a perspective view of part of a heat exchanger,
FIG. 2 is an elevation of part of a machine for making the part heat exchanger shown in FIG. 1,
FIG. 3 is a section along the line 3—3 in FIG. 2,
FIG. 4 is a section along the line 4—4 in FIG. 2, and FIG. 5 is a diagrammatic illustration of a heat exchanger assembly line.

In FIG. 1 a strip of aluminium foil 10 is corrugated in such a way as to form successive triangular passages 11. The sides 12 of the passages 11 form heat exchange fins, while the bases 13 are bonded by a heat curing adhesive to two parallel aluminium foil sheet-like metal members 14, 15. The members 14, 15 are joined near to their ends by tubular aluminium spools 16 having flanges 17 at each of their ends and these spools are also bonded by adhesive to the members 14, 15 respectively. The spools 16 are aligned with holes 26 in the members 14, 15.

A machine for assembling the corrugated strip 10, the members 14, 15 and the spools 16 is illustrated in FIGS. 2, 3 and 4. The machine has a cast iron bed 18 along which bracket members 19, 20 are slidably adjustable. The bracket members 19 have transverse slideways 21 in which bearing blocks 22 are slidable towards and away from each other. The bearing blocks 22 carry platens 23 having cavities 24 in which electric heater elements are positioned. The platens 23 are the same length as the metal members 14, 15 and at each end of each platen 23, there is fastened a basically cylindrical spigot 25 which is of slightly smaller diameter than that of the holes 26 in the metal members 14, 15 and also than the inner diameter of the spools 16. The inner edges of the spigots are relieved to allow for the thermal expansion of the metal members 14, 15.

Below the machine bed 18 there is fastened an upwardly acting pneumatic ram 27 connected by symmetrical inclined links 28 to two levers 29, each located upon and keyed to one of two parallel shafts 30. The shafts 30 are carried in bearings in the bracket members 19, 20. Also keyed to the shafts 30 are ball ended levers 31, each of which engages in a bore in the bearing blocks 22. When the pneumatic ram 27 is operated, the links 28 cause the levers 29 to swing outwardly so that the ball ends of the levers 31 move inwardly to move the platens 23 and the spigots 25 towards each other.

The bracket members 19 also carry upper and lower parallel T-section rails 32, on each side of the centre ribs of which there are slidably mounted bars 33 having opposing grooves 34 adapted to receive edge flanges which extend along the length of the metal members 14, 15. The bars 33 are spring loaded towards each other by springs 35. The bed 18 also supports carriers 37 which are vertically movable under the control of pneumatic rams and which provide locations for the spool 16. As may be seen from FIG. 4 ramps 38 are provided on the bearing blocks 22 and these ramps engage corresponding ramps 39 formed on levers 40 which are pivoted at their outer ends to the bracket members 19. The other ends of the levers 40 engage in bores in the bars 33 so that as the platens 23 move towards each other, the co-acting ramps 38 and 39 rotate the levers 40 to move the grooves 34 out of engagement with the flanges on the metal members 14, 15. Plungers 41 controlled by cables 42 engage in bores 43 in the bars 33 to hold them in this position.

In operation, previously corrugated aluminium strip 10 is introduced between the opposing edges of the centre ribs of the T-section rails 32, with the triangular passages 11 arranged vertically. One of the spools 16 is positioned on one of the carriers 37, which is raised by a pneumatic ram, at one end of the corrugated strip 10, the metal members 14, 15 are slid along the grooves 34 from the opposite end and the other spool 16 is placed on the other raised carrier 37 between the members 14, 15. The pneumatic ram 27 is then actuated to move the heated platens 23 towards each other. The spigots 25 first pass through the holes 26 to locate the metal members 14, 15 and then the spigots 25 enter the spools 16. At this point the ramps 38 on the bearing blocks 22 engage the corresponding ramps 39 on the levers 40. The other ends of the levers 40 engaged in the bores in the bars 33 are thereby rotated to move the bars 33 apart and to take the grooves 34 out of engagement with the flanges along the edges of the members 14, 15. The platens 23 next move on to their final position where they clamp the assembly formed by the corrugated strip 10, metal members 14, 15 and the spools 16 firmly together and the heat from the platens and the spigots 25 cures adhesive placed between the parts to bond the assembly together.

Preferably the face of each of members 14, 15 to be bonded to the strip 10 is coated with adhesive before the member is located relative to the strip 10.

As the adhesive has little strength at this stage, cooling air is introduced through unshown pipes in the rails 32 to impinge on the corrugated strip 10, the metal members 14, 15 and the spools 16 to provide an initial partial setting of the adhesive after which the pneumatic ram 27 is retracted to withdraw the platens 23 and the spigots 25, and the carriers 37 are lowered so that the bonded assembly can be withdrawn from one end of the machine. The bars 33 are released by the cables 42 which withdraw the plungers 41 from the bores 43 in the bars 33.

It is possible for the heat exchanger to be assembled and bonded together as a part of an assembly line process as may be seen from FIG. 5.

Referring to FIG. 5, there is shown diagrammatically a series of stations, STA1 to STA6. An endless conveyor track 45 passes continuously between the stations in a well known manner. At station STA1 a sheet-like aluminium foil member 14 is loaded on to the track 45 and the member 14, supported by the track, is then passed upon the movement of the track 45 to station STA 2, where a corrugated foil strip 10 is positioned on the member 14. The strip 10 and member 14, supported by the track, are then passed to station STA 3, where two spools 16 are placed on the sheet member 14 in alignment with holes 26 therein. At STA 4, to which the assembly supported upon the track 45 is next passed, a second sheet member 15 is positioned on top of the corrugated strip 10. At STA 5, pressure is applied by means indicated at 46 and corresponding to the platens 23 of the apparatus shown in FIGS. 3 and 4, to press the two sheets 14, 15 on to the corrugated foil 10. At STA 6, with the assembly still under pressure, heat is applied to cure heat-settable adhesive, which was intially on the surfaces of the members 14 and 15 to be bonded, and to bond the assembly together. Further stations (not shown), at each of which the application heat is maintained upon the assembly, can be provided until the adhesive has cured. The assembly is then allowed to cool before being unloaded at a final station not shown.

We claim:

1. An apparatus for manufacturing an aluminium heat exchanger having an element comprising a strip of corrugated aluminium foil, two sheet-like aluminium members and an adhesive bonding the corrugated strip between the aluminium members wherein said apparatus comprises:

a clamping device having a pair of bars operative to clamp the corrugated strip, with its surfaces to be bonded to the sheet-like members exposed, means for locating the sheet-like members with the surfaces to be bonded facing the corrugated strip, a mechanism for pressing the sheet-like members against the corrugated strip, said mechanism comprising, a pair of jaws mounted for movement laterally of said bars of said clamping device and operative to clamp the unbonded element and spigot means carried by each of said jaws and arranged to register with and engage within a hole in said sheet-like members during a closing movement of said jaws to press the sheet-like members against the corrugated strip, and heaters arranged to heat the elements to cure the adhesive between the sheet-like members and the strip.

2. An apparatus as set forth in claim 1 wherein said heaters are mounted in each jaw and are operative to heat said sheet-like members to cure the adhesive between the members and the strip.

3. An apparatus as set forth in claim 1 wherein means are provided for moving the bars progressively out of engagement with the supported aluminium members during a closing movement of the jaws.

\* \* \* \* \*